United States Patent [19]

Kurichh

[11] 4,131,324
[45] Dec. 26, 1978

[54] TRACTOR-TRAILER AIR BRAKE SYSTEM WITH TRAILER MULTI-FUNCTIONAL EMERGENCY CONTROL VALVE FIXTURE

[75] Inventor: Sham L. Kurichh, Owosso, Mich.

[73] Assignee: Midland-Ross Corporation, Cleveland, Ohio

[21] Appl. No.: 856,119

[22] Filed: Nov. 30, 1977

[51] Int. Cl.² .............................................. B60T 13/00
[52] U.S. Cl. ............................................. 303/7; 303/9
[58] Field of Search ..................... 303/40, 52, 29, 7, 9, 303/28, 30, 64, 80

[56] References Cited

U.S. PATENT DOCUMENTS

| 3,862,782 | 1/1975 | Horowitz | 303/30 |
| 3,992,064 | 11/1976 | Carton | 303/7 |
| 4,003,605 | 1/1977 | Fannin | 303/9 |

Primary Examiner—Trygve M. Blix
Assistant Examiner—Reinhard J. Eisenzopf
Attorney, Agent, or Firm—Woodrow W. Portz

[57] ABSTRACT

An air brake system designed primarily for a plurality of trailer axles in which a service reservoir is provided for each axle and a multiple valve module is connected with the reservoirs to assure a supply of parking brake air from any one of the reservoirs in response to various emergency conditions, such as severance of either of the tractor service or supply lines, or depletion of air in one reservoir.

4 Claims, 5 Drawing Figures

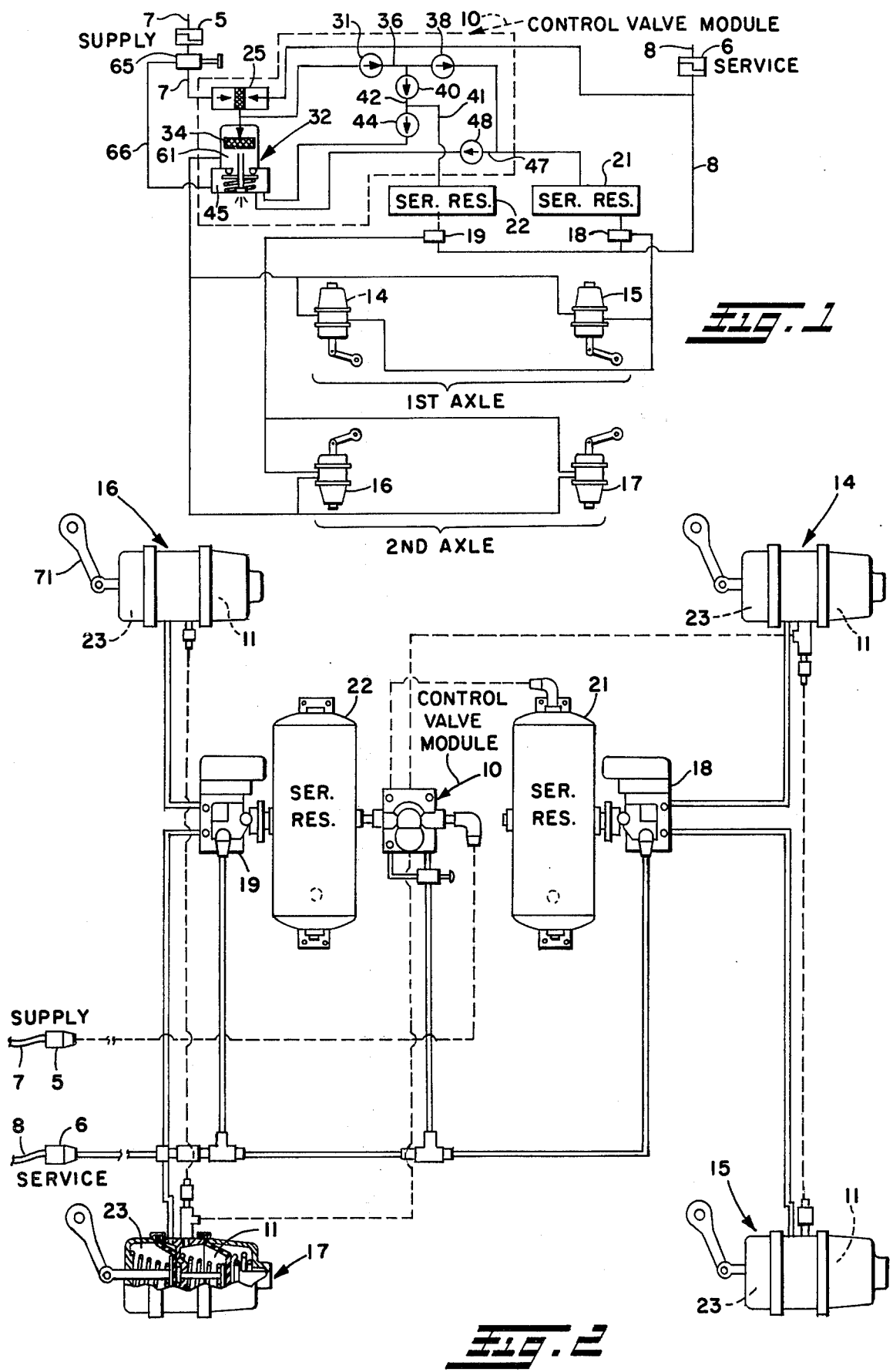

TRACTOR-TRAILER AIR BRAKE SYSTEM WITH TRAILER MULTI-FUNCTIONAL EMERGENCY CONTROL VALVE FIXTURE

BACKGROUND OF THE INVENTION

One of the requirements of U.S. Federal Regulation FMVSS121 for highway tractor-trailer combinations (rigs) is that at least one trailer-mounted reservoir provides sufficient air entrapment for at least one parking brake release in order that the rig be movable from a parked position causing traffic difficulties. In principle, an air control system for brakes is needed that allows free flow of air to all air-operated devices under normal conditions but, in an emergency, seals off or isolates, e.g., the reservoirs and brake facilities associated with each axle of the trailer to prevent escape of air from that part of the system so that air is available for emergency movement of the rig from an undesired parking position to a position of safety. A system so arranged should store enough air to assure one or more emergency brake releases enabling a similar number of moves of the rig.

While there are various types of brake systems for operating the brakes of multiple-axle trailers, this invention is directed to that type which provides a service reservoir for each axle. In such a system, the facilities for assuring an emergency supply of air to the parking brake or spring chambers of the brake actuators involve, in the absence of the special fixture of the invention, a complication of line circuitry and many valves, especially check valves.

An object to this invention is to simplify and consolidate air-control and air-directing apparatus connecting a plurality of service reservoirs with emergency brake facilities into a multi-functional device or module capable of doing conventional functions as well as additional functions not presently realized in any system. Further objects are to make the brake system less expensive than the equipment it replaces, easier and less expensive to install, more readily accommodated within the trailer frame structure, and less prone to leakage through elimination of conduits and other elements of fluid circuitry. It is desired that the device comtemplated be capable of receiving air from the control or service line of the tractor as well as its supply line, and in case of its rupture of either line, be capable of distribution of air to spring chambers from any of the reservoirs carried on the trailer.

SUMMARY OF THE INVENTION

As basic components of the trailer air brake system in which the invention is incorporated, the system comprises a tractor supply line; a tractor air control line; and on the trailer, a pair of spring set brake actuators for each set of coaxial wheels of which each actuator has a service chamber and a spring chamber; a service reservoir for supplying control air for each set of wheels; a relay valve attached to each reservoir for passing air to the actuators for a set of said wheels with each relay valve receiving signal air from the tractor air control line; and a control valve module connected to both tractor lines for receiving air from either line and distributing it to the reservoirs and the actuator spring chambers.

The control valve module comprises a housing and valve elements supported therein arranged to define (1) a two-way check valve connecting with the tractor control and supply lines for forwarding air through the module from the line having the higher pressure; (2) a relay valve having an inlet chamber and, an outlet chamber, and a cylinder and piston assembly located for receiving signal air from the two-way check valve, (3) a minimum-pressure check valve located for receiving air from the two-way check valve, (4) a first check valve for receiving air from the minimum-pressure check valve and discharging it into a first reservoir (5) a second check valve located for receiving air from the minimum-pressure check valve and discharging air into a second reservoir; (6) a third check valve located for receiving air from the first check valve and from the first reservoir and discharging air into the inlet portion of the relay valve; and (7) a fourth check valve connected for receiving air from the second check valve and from the second reservoir and discharging the air into the inlet portion of the relay valve. The outlet portion of the relay valve is connected to all of the spring chambers.

The brake system just indicated permits the supply and control lines to extend through quick-disconnectors on the tractor directly to the two-way check valve portion of the module. A desirable addition to the system is a two-position three port valve in the supply line of which a third port is connected with the inlet portion of the relay valve. In one position, air flows uninterrupted through the supply line. In the other position, air flows from a reservoir through the inlet portion of the relay valve and against the piston of the relay valve to cause the opening thereof and passage of air from the outlet relay portion to the spring chambers of the brake actuators. In this manner, trailer brakes may be temporarily released.

BRIEF DESCRIPTION OF THE DRAWING

FIG. 1 is a diagram of the air line circuitry of a trailer brake system in accordance with the invention.

FIG. 2 is a schematic view illustrating various components of the system served by the circuitry of FIG. 1.

DESCRIPTION OF PREFERRED EMBODIMENTS

Figure 3:
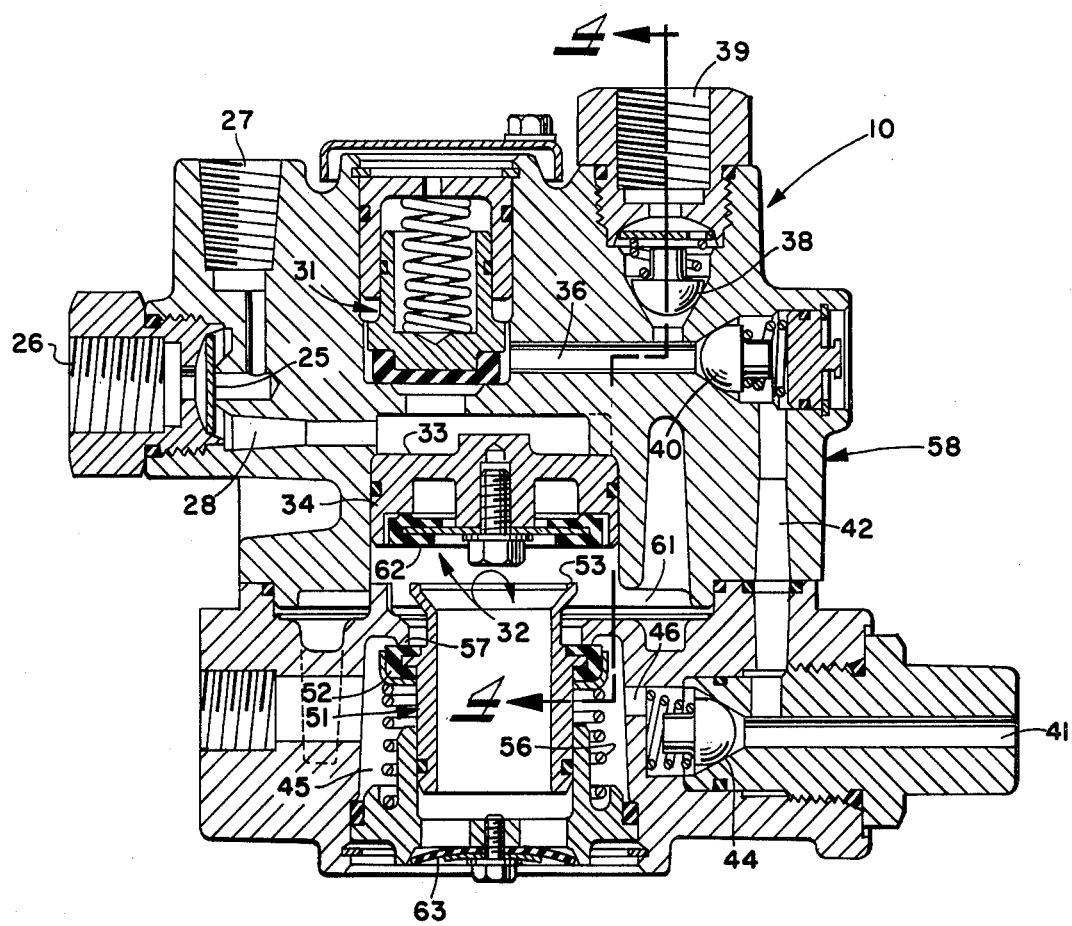
FIG. 3 is a cross section taken through a central portion of the control valve module illustrated in FIGS. 1 and 2.
Figure 4:
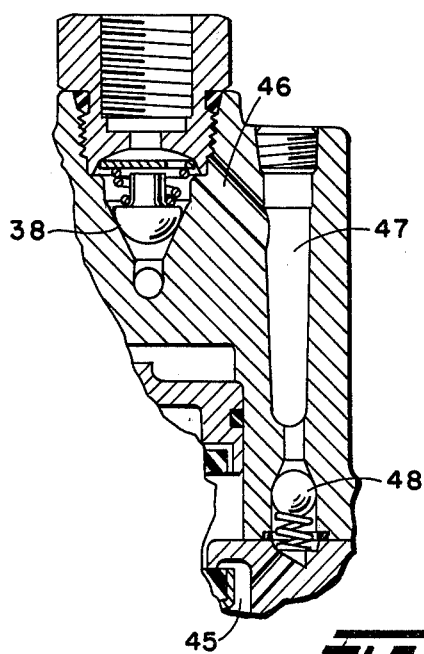
FIG. 4 is a view in fragmentary cross section of a portion of the control valve fixture as viewed along line 4—4 as drawn in FIG. 3.

FIGS. 1 and 2 are diagramatic and schematic views of a tractor trailer brake system depicting essentially the portion of the system carried on the trailer as connected with quick-disconnect couplings 5 and 6, known as "gladhands", mounted on the tractor in supply line 7 and service line 8, respectively. Air from the tractor is supplied to a control valve module 10 through either line 7 or 8 for the primary purpose of distributing air to the spring chamber 11 of actuators 14 and 15 of one axle and actuators 16 and 17 of a second axle. The module 10 operates to supply air to the actuators under normal service, and to temporarily supply air to the actuators in emergency situations or when the supply or service air sources are disabled but movement of the rig is required. Braking is effected in the usual manner by signal pressure transmitted along the service line 8 to relay valves 18, 19 attached to a first service reservoir 21 and a second service reservoir 22, respectively. Valves 18, 19 control the flow of brake actuating air from the reservoirs to the service chambers 23 of the actuators. The actuators associated as shown with each axle need not be connected by a common axle but may be mounted on the vehicle to be in generally coaxial relationship.

Referring now to FIGS. 1 and 3, the control valve module 10 comprises in the order by which air flows through the module, a two-way check valve 25 arranged with respect to a supply line port 26 and a service line port 27 to selectively pass air from either port to a passageway 28. Air is forwarded in passageway 28 first or simultaneously to a minimum-pressure check valve 31 and the cylinder-piston portion of a relay valve 32. The resident air pressure of passageway 28 is communicated to surface 33 of the relay control piston 34.

In practice, the minimum pressure valve is set to pass air into a passageway 36 when a selected pressure of, e.g., 55 to 60 psi, is reached in the passageway 28. Air under pressure in passageway 36 flows through a second check valve 38 and outward of a port 39 into the first service reservoir 21. Air also flows from passageway 36 through a third check valve 40 and outward of a port 41 into a second service reservoir 22 by way of passageway 42. Hence, line pressures above setting of minimum-pressure valve 31 or pressure in the second reservoir 22 may be passed through a check valve 44 communicating with the inlet chamber 45 of the relay valve 32 through a port 46. Also, air may backflow from the first service reservoir 21 through the passageway 46, 47 and a check valve 48 into the inlet chamber 45 of the relay valve module 10 should there be an absence of suitable pressure in service and supply lines 7, 8, or the service reservoir 22.

Considering now further details of the relay valve 32 of module 10, the valve further comprises a modulation tube 51 having an exterior annular flange forming a resilient shoulder or seat 52 and an end surface 53 which participate in the spring chamber supply valve function of the relay valve and in the exhaust valve function, respectively. Tube 51 is urged toward the piston 34 by a spring 56 to cause the shoulder 52 to seat against the annular seat 57 formed by or fixed in the fixture housing 58. Items 57 and 52 form the valve which controls passage of air from the inlet chamber of the valve to its outlet chamber 61. Outlets of chamber 61 to the spring chambers are not shown in FIG. 3. The inner face of the piston 34 is provided with a resilient washer 62 which seats against end surface 53 of the tube 51 to prevent exhausting of air from the outlet chamber 61 through an exhaust valve 63. In the event the spring chambers of the brake actuators 14, 17 are to be exhausted for emergency or parking brake setting, the piston 34 moves away from end 53 of the tube to cause shoulder 52 to engage seat 57 and consequent closing of inlet chamber 45.

Figure 5:
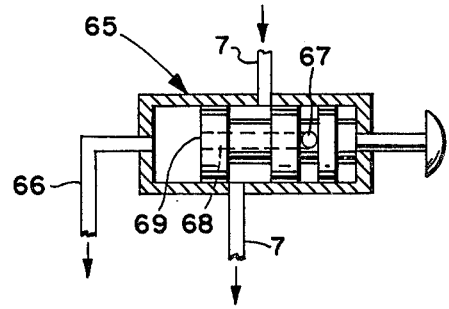
FIG. 5 is a schematic view of a manual brake release valve shown in FIGS. 1 and 2.

Assuming one or more of the reservoirs are charged with air in the event of a failure of pressure in the supply and service lines, a three-port two-position manual valve 60 is positioned in supply line 7 with two ports connecting into line 7 and a third connecting with the inlet portion 45 of the relay valve 32 through a line 66. FIG. 5 is exemplary of one construction of a valve which may pass air at one position from one portion of line 7 to another downstream portion thereof and, at another position, pass air from the upstream portion of line 7 through a port 67 and outward of a central bore of the valve piston 69 into line 66.

The module 10 is operable on low tractor supply or service pressures to open up the relay valve to pass on to spring chambers of the actuators the relatively high stored pressures of the service reservoir. This is of advantage in certain situations wherein the tractor air has been reduced by excessive braking, or air leaks during parking, etc. A glance at FIG. 3 will disclose that the area of piston 34 exposed to the passageway 28 is much greater than the effective area of the flange and associated valve seat 52 of the modulation tube 51. The ratio of area may be of the order of 10 to 1. Hence a relatively low pressure in the tractor supply or service lines may be used to release the spring-set brakes for prompt movement of the rig after parking.

In operating the system to release parking brakes, air enters from the supply line 7 and passes through the double-check valve 25 to act on piston 34 of relay valve 32 and also to pass through the minimum-pressure setting valve provided that pressure of line 7 is above the minimum-pressure setting valve 31. The pressure in passageway 28 simultaneously acts upon the control piston 34 and forces it against the end of modulation tube 51. Further increase in the supply pressure causes the control piston to continue its movement against the spring 56 until it unseats the valve comprising seat 57 and shoulder 52. Opening of the relay valve allows air which has traversed check valves 38 and 44, and inlet chamber 45 of the relay valve to flow into outlet chamber 61 and outward into the spring chambers of the actuators.

Operation of the brakes to exhaust the actuator spring chambers occurs by a severe drop in pressure either by much use of a control valve in the tractor or through a break in the supply line. In event of such pressure drop, the check valves 38, 40, and 48 close to maintain the pressure in the service reservoirs. Also, the control piston 34 moves in its outward direction away from the modulation tube 51 until the inlet valve at seat 57 is closed. As the control piston continues its movement away from the tube 51, the items 53 and 62 part and exhaust air is permitted to pass outward of the exhaust valve 63 to effect such a reduction of pressure in the spring chambers as to set the trailer brakes.

In case of loss of pressure in the service reservoir 21, the check valves 40 and 48 will close to protect the pressure of the service reservoir 22. The minimum-pressure valve 31 holds the supply line pressure at the pressure setting at valve 31 on, e.g., 55 psi.

In case of loss of pressure in the service reservoir 22, the check valves 38 and 44 close and thus isolate the pressure of service reservoir 21.

Again, the minimum-pressure valve 31 holds the supply line pressure at the minimum pressure setting.

The two-way check valve 25 of the fixture 10 is provided to avoid double-loading of the slack adjusters, one of which is generally indicated for actuator 16 at 71. When the pressure in the supply line 7 has dropped so that the parking brakes are applied, and the driver applies pressure to the service brakes, i.e., pressures the service line 8, the valve 25 will close off the supply port 26 and feed pressure to both the spring chambers and the service brake chambers of the actuators. The parking brakes are thereby released. In another function, the check valve 25 will close off the service port 27 when pressure is applied through the supply port 26 thereby preventing the service brakes from being applied in an otherwise double-loading situation.

What is claimed is:

1. A trailer air brake system in combination with a tractor air supply line and a tractor air control line comprising;
   a pair of spring-set brake actuators for each set of wheels;
   each said actuator having a spring chamber and a service chamber;
   a service relay valve for each reservoir connected therewith and the service chambers of said actuators for each said set of wheels for passing air from the corresponding reservoirs to said associated service chambers, said relay valve being connected with said tractor air control line to receive signal pressure;
   a control valve module for receiving air under pressure from said lines and distributing the air to said reservoirs and said spring chambers, said module comprising a housing and valve elements supported therein defining;
   a two-way check valve connecting with said lines and constructed for forwarding air from the line having the higher pressure;
   a relay valve having an inlet chamber, an outlet chamber, a cylinder and piston located for receiving signal air from said two-way check valve and mechanism interacting with said piston to exhaust air from the outlet chamber;
   a first check valve located and constructed for passing air from said two-way check valve at a selected minimum pressure;
   a second check valve receiving air from said first check valve and discharging air into a first of said reservoirs;
   a third check valve receiving air from said first check valve and discharging air into a second of said reservoirs;
   a fourth check valve receiving air from said third check valve and from said second reservoir and discharging air into said relay valve inlet portion;
   said outlet portion of said relay valve being connected to said spring chambers.

2. The system of claim 1 wherein:
   said lines extend from a tractor through quick-disconnect connectors for connecting directly with said two-way check valve.

3. The system of claim 1 comprising a hand valve located in said supply line having a first port for receiving air from the supply line, a second port for passing air to said two-way check valve, and a third port connected with said inlet chamber, said valve being adjustable to one position wherein it is open between the first and second port, and in another position wherein it is open between the third and second ports.

4. The system of claim 1 wherein:
   said module relay valve mechanism comprises a valve seat and a modulation tube extending with clearance through the valve seat in reciprocable substantially coaxial relation with said piston, said tube having an end surface engageable with said piston to define an exhaust valve and a shoulder portion engagable with said seat through which said inlet chamber is communicable with said outlet chamber;
   the area of said piston exposed to pressure from said supply port being substantially greater than the effective area of said flange subjected to pressure from said inlet chambers when the flange engages said seat.

* * * * *